United States Patent [19]

Rinkewich

[11] Patent Number: 4,838,485

[45] Date of Patent: Jun. 13, 1989

[54] WATER DISTRIBUTION DEVICE AND SYSTEM INCLUDING SAME

[76] Inventor: Isaac Rinkewich, 12 Fishman Maimon St., Tel Aviv, Israel

[21] Appl. No.: 429,672

[22] Filed: Sep. 30, 1982

[30] Foreign Application Priority Data

Sep. 17, 1982 [IL] Israel ......................................... 66826

[51] Int. Cl.⁴ .............................................. A01G 27/00
[52] U.S. Cl. ....................................... 239/70; 239/99; 137/624.14
[58] Field of Search ............................ 239/70, 99, 251; 137/624.14

[56] References Cited

U.S. PATENT DOCUMENTS

| | | | |
|---|---|---|---|
| 3,108,609 | 10/1963 | Schroder | 137/124.14 |
| 3,720,232 | 3/1973 | Corliss et al. | 137/624.14 |
| 3,779,269 | 12/1973 | Gould | 137/624.14 |
| 3,827,459 | 8/1974 | Hunter | 239/70 |
| 4,407,451 | 10/1983 | Hunter | 137/624.14 |

Primary Examiner—Andres Kashnikow
Assistant Examiner—Michael J. Forman
Attorney, Agent, or Firm—Benjamin J. Barish

[57] ABSTRACT

A water distribution device adapted to be connected to a pressurized water supply line includes a valve controlling the flow of water from the supply line to a water distributor, a cyclically-operable-timer driven through cycles of operation by the energy of the pressurized water, and a coupling between the timer and the valve, which coupling is effective to actuate the valve to its open position for a minor portion of each cycle, and to actuate the valve to its closed position for a major portion of each cycle. Preferably, the cycles are from 1-60 minutes each, and the minor portion of each cycle is about one-fifth to one-fiftieth of the complete cycle. Also described is a water distribution system including a plurality of such devices connected to a common water supply line and randomly operated.

22 Claims, 6 Drawing Sheets

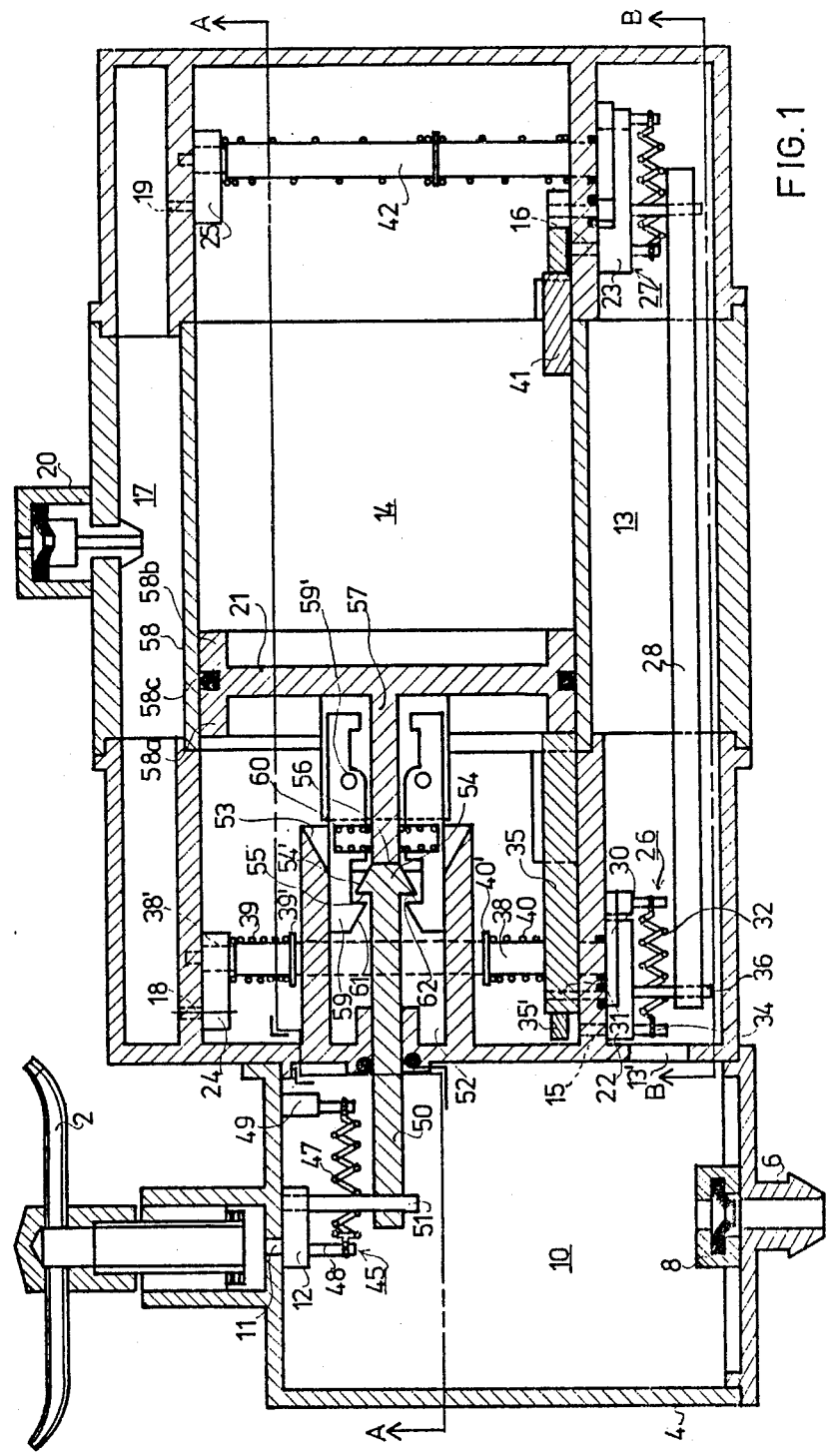

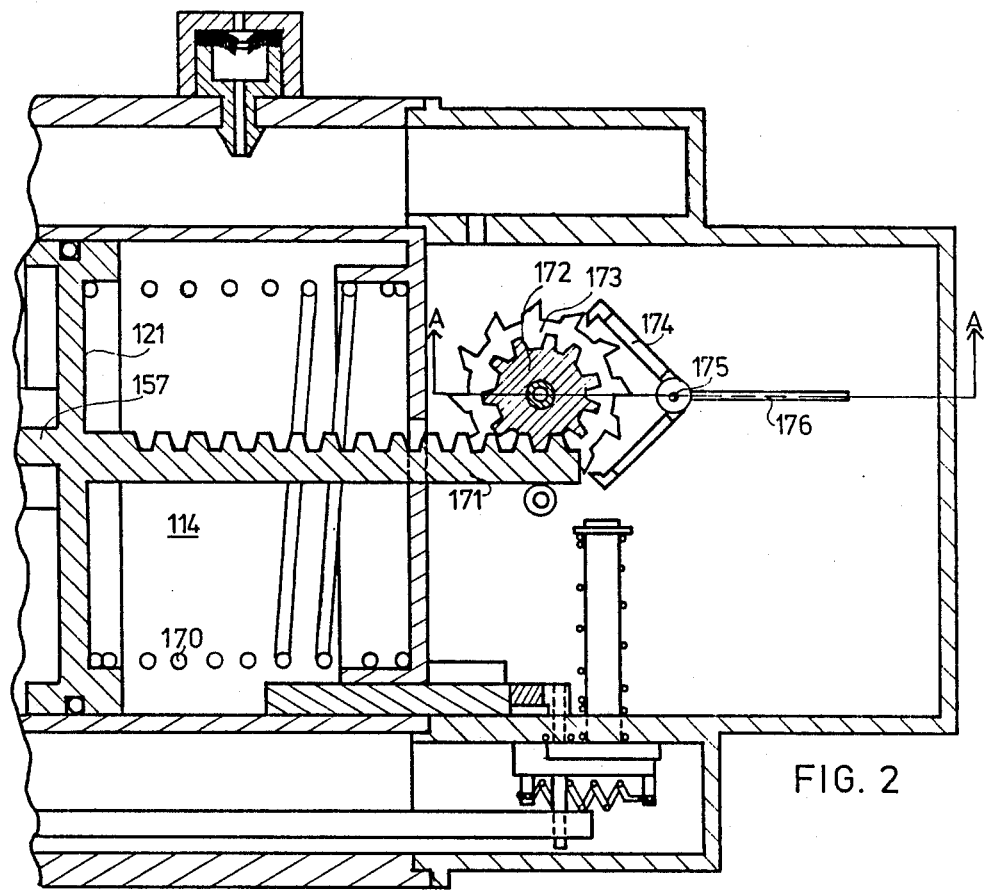
FIG. 2
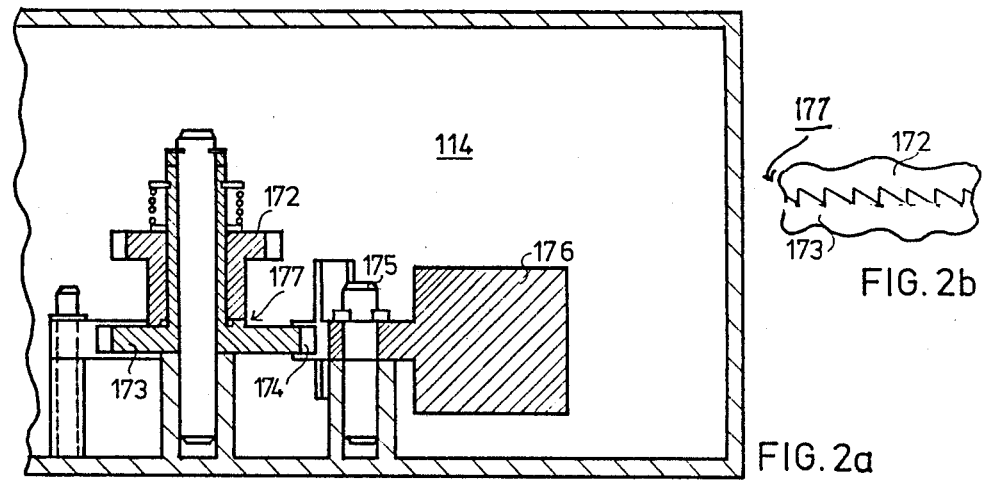
FIG. 2a
FIG. 2b

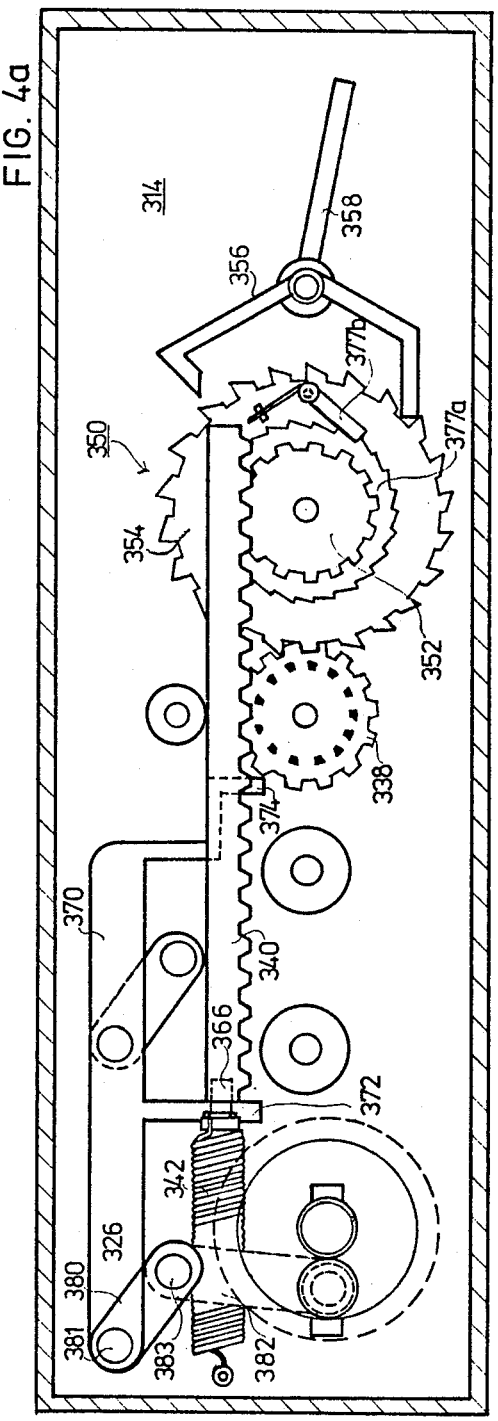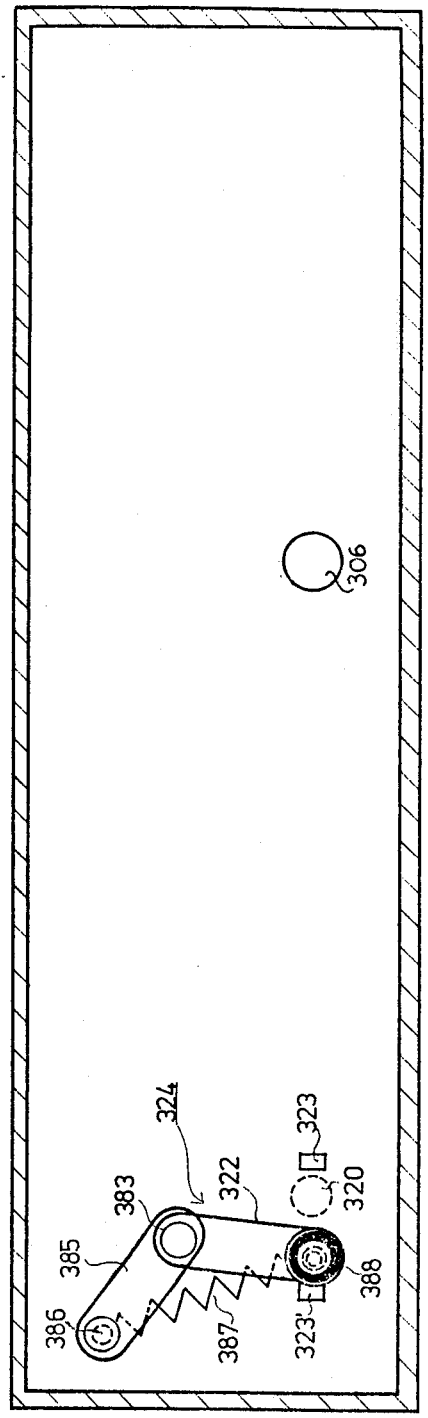

WATER DISTRIBUTION DEVICE AND SYSTEM INCLUDING SAME

BACKGROUND OF THE INVENTION

The present invention relates to water distribution devices, such as water sprinklers, sprayers, and drip-irrigation emitters commonly used in water irrigation systems. The invention also relates to water distribution systems including such devices.

SUMMARY OF THE INVENTION

An object of the present invention is to provide a novel water distribution device, and also a water irrigation system including a plurality of such devices, having advantages in a number of respects over known devices and systems, as will be described more particularly below.

According to a broad aspect of the present invention, there is provided a water distribution device adapted to be connected to a pressurized water supply line, characterized in that it includes: a valve controlling the flow of water from said water supply line to a water distributor; and a cyclically-operable-timer driven through cycles of operation by the energy of the pressurized water in said supply line; the cyclically-operable-timer comprises a displaceable member continuously reciprocated by the energy of the pressurized water in the supply line through a forward stroke and a return stroke during each cycle. Further included are a retarding device for retarding the movement of the displaceable member during at least one of the strokes, a valve actuator, and a coupling between the displaceable member and the valve actuator effective, during predetermined points in the forward and return strokes of the displaceable member, to cause the valve actuator to actuate the valve to its open position for a minor portion of each cycle, and to actuate the valve to its closed position for a major portion of each cycle.

Preferably each cycle is from 1–60 minutes, and the minor portion of each cycle may be from about one-fifth to one-fiftieth of the complete cycle. As a preferred example, it is about one-tenth of the complete cycle for a 10 minute cycle.

Four embodiments of the invention are described below for purposes of example. In all the described embodiments, the cyclically-operable-timer comprises a displaceable member reciprocated through a forward stroke and a return stroke, said coupling including a valve actuator effective to actuate the valve to its open and closed positions during the minor and major portion, respectively, of each cycle.

Water distribution devices constructed in accordance with the foregoing features are to be distinguished from other known forms of timer-controlled water distributors such as water sprinklers and the like. Thus, by turning-on the water control valve for a minor portion of each cycle of the cyclically-operable-timer, a water distribution system can be provided with a number of such devices, e.g. water sprinklers, all randomly operating in an intermittent manner for a small portion of each cycle. Thus, by this random, intermittent operation of each sprinkler, the overall load requirements for the system are substantially reduced enabling the system to utilize smaller-size pipes, lower-capacity pumps, and the like, thereby substantially reducing the overall cost of the system. At the same time, this intermittent random operation permits water at relatively high pressure to be supplied at short intervals and therefore provide, among other advantages, larger area coverage than if the same total quantity of water were applied continuously, such as in conventional drip-irrigation. Moreover, the cylically-operable timers are driven through their cycles of operation by the energy of the pressurized water in the supply line, thereby obviating the need for electrical power or other power source in the field.

Further features and advantages of the invention will be apparent from the description below.

BRIEF DESCRIPTION OF A PREFERRED EMBODIMENT

The invention as herein described, by way of example only, with reference to the accompanying drawings, wherein:

FIG. 1 is a longitudinal sectional view illustrating one form of water distribution device constructed in accordance with the present invention.

FIG. 2 is a longitudinal sectional view illustrating a second form of water distribution device constructed in accordance with the present invention; FIG. 2a being a sectional view along lines A—A of FIG. 2, and FIG. 2b being a fragmentary view;

FIGS. 4a and 4b being sectional views along lines A—A and B—B of FIG. 4, respectively.

DESCRIPTION OF PREFERRED EMBODIMENTS

Figure 1A:
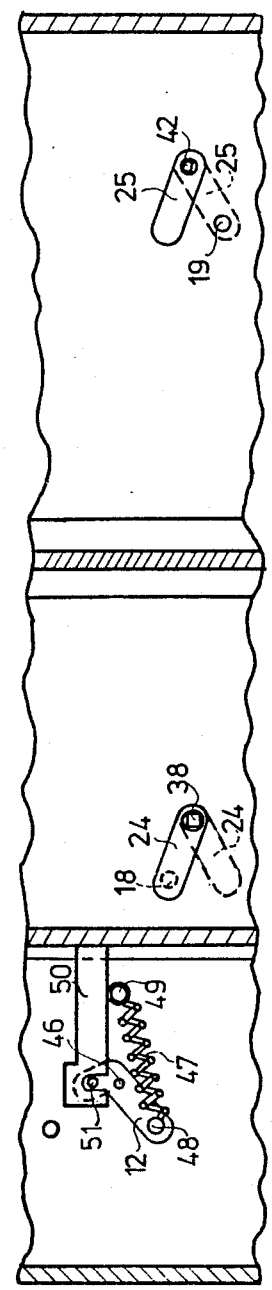
FIGS. 1a and 1b being sectional views along lines A—A and B—B of FIG. 1, respectively.

The water distribution device illustrated in FIG. 1 includes a sprinkler 2, preferably of the hammer-type or reaction-type for imparting a rotary movement to the sprinkler nozzles. The device further includes a housing, generally designated 4, including a connector 6 for connecting same to a pressurized water supply line (not shown). Preferably, connector 6 includes a pressure-regulator or flow-regulator 8 for controlling the water flow into the housing 4.

The interior of housing 4 is divided into a plurality of chambers, including chamber 10 having an outlet port 11 leading to the water sprinkler 2, the latter port being controlled by a valve member 12 which may be actuated to an open position to permit the flow of water from chamber 10 to the sprinkler 2, or to a closed position to terminate the flow of water from the chamber to the sprinkler.

The interior of housing 4 includes a further chamber, generally designated 13, which communicates with chamber 10 via a port 13'. Chamber 13 in turn communicates with a further chamber 14 via a port 15 at one end (left end) of chamber 14, and another port 16 at the opposite end. Chamber 14 in turn communicates with a further chamber 17 via a first port 18 at one end of the chamber, and a second port 19 at the opposite end. Chamber 17 communicates with the atmosphere via a pressure-regulated slow discharge nozzle 20.

A piston 21 is disposed within chamber 14 and is displaceable in that chamber by the pressure on the opposite sides of the piston. Thus, when ports 15 and 19 on the opposite sides of the piston 21 are open, and ports 16 and 18 are closed, piston 21 is driven from the left side to the right side of chamber 14, this constituting a forward stroke of the piston, and when ports 16 and 18 are open, and ports 15 and 19 are closed, the piston is driven from the right side to the left side of chamber 14, this constituting a return stroke of the piston. To effect this reciprocation of the piston 21, ports 15, 16, 18, and 19 are each provided with a valve member 22, 23, 24 and 25, respectively, movable by end-of-travel mechanism to be described below, controlled by piston 31 in order to open and close their respective ports. All the valve members 22–25, together with valve member 12 cooperable with the main port 11 to the water sprinkler 2, are all controlled by snap-action toggle mechanisms, also to be described below, so as to move from the open to the closed position, or vice-versa, by a snap-action.

Valve members 22 and 24 at one end of chamber 14 are controlled by a common toggle mechanism 26 such that when valve member 22 is in its open position with respect to its port 18, valve member 24 is in its closed position with respect to its port 18, and vice versa. Similarly, valve members 23 and 25 at the opposite end of chamber 14 are controlled by a common toggle mechanism 27 such that when valve member 23 is in its open position with respect to its port 16, valve member 25 is in its closed position with respect to its port 19, and vice versa. Toggle mechanism 26 at one end of chamber 14 is coupled by a pull-link 28 to toggle mechanism 27 at the opposite end of the chamber such that when valve member 22 controlled by toggle 26 is in its open condition with respect to its port 15, valve member 23 controlled by toggle 27 is in its closed position with respect to its port 16, and vice versa.

Figure 1B:
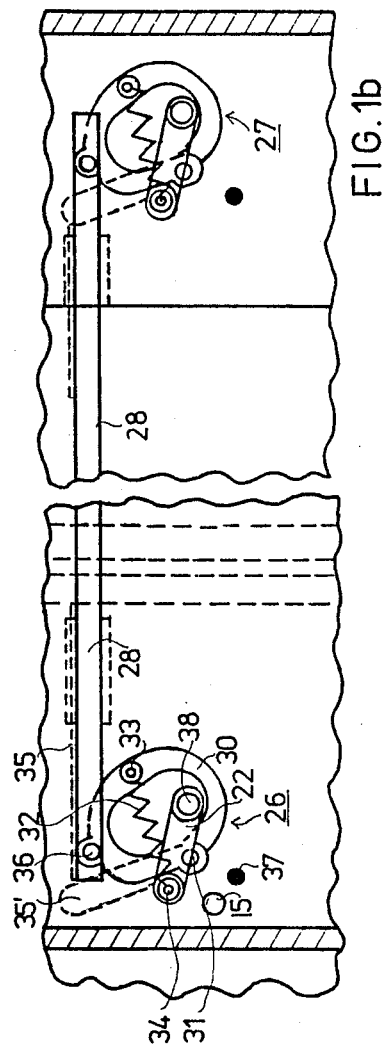

More particularly, it will be seen from FIGS. 1 and 1b, that the toggle mechanism 26 comprises a toggle link 30 pivotably mounted by pin 31 and an over-centered spring 32 secured between a pin 33 on the toggle link, and another pin 34 on the valve member 22. Toggle pin 31 carries a link 35' engageable by push-rod 36 such that when the latter rod is pushed (in a manner to be described below) to the leftward position illustrated in FIGS. 1 and 1b, the toggle link 30 is pivoted to the illustrated position wherein valve member 22 is open with respect to its port 15. Toggle link 30 is also coupled to pull-link 28 by a pivot pin 37, such that when the latter link is pulled rightly (as will also be described below), the toggle link 30 is pivoted (clockwise in FIG. 1b) about its pivot 31, lowering its pin 33 until spring 32 passes the center pivot 31, whereupon valve member 22 is moved, by a snap-action, against a stop 37 to the closed position of the valve member with respect to its port 15.

Valve member 22 cooperable with port 15 at the bottom of chamber 14 is coupled by a shaft 38 to valve member 24 cooperable with port 18 at the upper end of the chamber, such that when valve member 22 is in its open position (the position illustrated in FIGS. 1 and 1b), valve member 24 is in its closed position, and vice versa. Both valve members are biased against the respective faces of the housing wall by coil springs 39 and 40 applied at the opposite ends of shaft 38, to assure a tight seal of the valve members when they are in their closed positions with respect to their ports 15 and 18. This is accomplished by making the upper end 38' of shaft 38 of square-section and received in a square bore formed in the valve member 24 to permit it to move axially of the shaft. The lower valve member 22 is secured to shaft 38 to engage the outer face of the housing wall formed with bore 15. Spring 39 acts between shoulder 39' and valve member 24 to press the latter against the inner face of the housing; and spring 40, which is stronger than spring 39, acts against shoulder 40' and the inner face of the housing to urge the latter towards its square-section and 38', thereby to press valve member 22 against the outer face of the housing wall formed with bore 15, and the inner face of valve member 24 against the inner face of the housing wall formed with bore 18.

In the other toggle mechanism 27, which actuates the valve members 23 and 25 with respect to ports 16 and 19 at the opposite end of chamber 14, is of the same construction as toggle mechanism 26 and is also operated by pull-link 28, and by a push-rod 41 (corresponding to push-rod 35 for toggle 26). The shaft (corresponding to shaft 38 of toggle 26) connects the two valve members 23, 25 and is indicated at 42.

Valve member 12, controlling the flow of water through the main port 11 to the water sprinkler 2, is also actuated by a snap-action toggle mechanism, generally designated 45. As shown particularly in FIG. 1a, valve member 12 is pivotably mounted about a pin 46 and is urged either to its open condition (illustrated in FIG. 1a) or its closed condition, by an over-center spring 47 secured between a pin 48 on the valve member, and another pin 49 fixed to the housing. The valve member 12 is actuated to either of the above two stable states by an actuator rod 50 pivotably mounted to the valve member by a pin 51.

Actuator rod 50 extends from chamber 10 into a cylindrical housing 52 within chamber 14, which housing is formed with an open end having a conical-shaped mouth 53. The end of the actuator rod 50 within housing 52 is formed with an annular shoulder or projection 54 having a flat inner annular face 55, a flat end face 56, and a conically-tapered outer face 54' joining these two faces.

Piston 21 movable within chamber 14 is formed with a centrl stem 57 engageable with the flat end face 56 of actuator rod 50 in the extreme left position of the piston, as illustrated in FIG. 1. Piston 21 is further formed with an annular ring 58 defining inner and outer flanges, 58a, 58b extending on the opposite sides of the piston with a sealing ring 58c in between. The inner flange 58a is adapted to engage push-rod 35 of toggle 26 at one extreme position of the piston; and the outer flange 58b is adapted to engage push-rod 41 of toggle 27 at the other extreme position of the piston.

A pair of fingers 59 are pivotably mounted to the inner portion of piston 21 by means of pins 59' and are biassed to their outer positions by springs 60 interposed between the fingers and the central stem 57. The end faces of the fingers 59 remote from piston 21 are conically tapered, as shown at 61, the tapers terminating in flat annular shoulders 62.

Briefly, stem 57 is effective, at the innermost position of piston 21, to engage the end face 56 of actuator rod 50 and to move it leftwardly in order to actuate the toggle 45 so as to move valve member 12, by a snap-action, to the valve-open position with respect to its port 11. At this time, the fingers 59 are in their innermost positions in alignment with projection 54 on the actuator rod 50. Thus, during the early portion of the opposite movement of the piston (i.e., in the rightward, or forward-stroke, direction illustrated in FIG. 1), the fingers 59 engage the flat annular face 55 of projection 54 to move the actuator rod 50 in the opposite direction, and thereby to actuate toggle 45 to move the valve member 12, by a snap-action, to the valve-closed position with respect to its port 11. This movement of the actuator rod 50 by the fingers 59 is accomplished only at the early portion of the rightward movement of the piston 21, until the ends of the fingers engage the conical face 53 of housing 52, whereupon springs 60 pivot the fingers outwardly thereby releasing the fingers from the projection 54 of the actuator rod.

More particularly, the device illustrated in FIG. 1 operates as follows:

Assuming, first, that the parts are in the positions illustrated in FIGS. 1, 1a and 1b, it will be seen that the main valve member 12 is in its open position with respect to port 11, so that the water inletted via inlet 6 into chamber 10 will flow through port 11 to the water sprinkler 2 and will be thereby distributed by the sprinkler. In this starting position, toggle mechanisms 26 and 27 are in the illustrated positions wherein valve members 22 and 25 are open with respect to their ports 15 and 19, and valve members 23 and 24 are closed with respect to their ports 16 and 18, respectively. Accordingly, the high pressure from the water supply line will also be applied via chamber 13 into chamber 14 at the left side of piston 21 and will thereby drive the piston 21 rightwardly.

This rightward movement of the piston 21 constitutes its forward stroke, and the subsequent leftward movement of the piston constitutes its return stroke.

As described earlier, at the beginning of this forward stroke of piston 21, fingers 59 are in their inner positions in alignment with the annular face 55 of projection 54 on the actuator rod 50. These fingers will therefore move the actuator rod rightwardly shortly after the beginning of the forward stroke, and will thereby actuate the toggle mechanism 45 to move valve member 12 to its valve-closed position, thereby turning-off the flow of water via port 11 to the water sprinkler 2. After this has been accomplished, fingers 59 move into alignment with the conical surface 53 of sleeve 52, whereby the springs 60 pivot the fingers outwardly, thereby releasing them from projection 54 of the actuator rod 50. The actuator rod, and the valve member 12 controlled thereby, are thus left in the valve-closed position during the remainder of the forward stroke of piston 21.

The high pressure introduced into the left side of chamber 14 continues to drive piston 21 rightwardly through its forward stroke until the outer annular flange 58b of piston 21 engages push-rod 41 of toggle mechanism 27. This actuates the toggle mechanism causing valve members 23 and 25 to be actuated by a snap-action so that valve member 23 is moved to its open position with respect to its port 16, and valve member 25 is moved to its closed position with respect to its port 19. In addition, this actuation of toggle mechanism 27 also causes the pull-link 28 to actuate toggle mechanism 26 at the opposite (left) side, such that valve member 22 is moved, also with a snap-action, to the closed position with respect to its port 15, and valve member 24 is moved to the open position with respect to its port 18.

This rightmost position of piston 21 defines the end of the forward stroke and the beginning of the return stroke, since now the water is introduced from chamber 13 into chamber 14 at the right side of piston 21 and drives the piston in the left direction, i.e., through its return stroke.

During the return stroke of piston 21, valve member 12 remains in its closed position so that sprinkler 2 is turned-off and does not distribute any water. Just before the end of the return stroke, stem 57 of piston 21 engages the end face 56 of actuator rod 50 to move same leftwardly, whereupon the toggle mechanism 45 actuates valve member 12, by a snap-action, to open its port 11 and thereby to connect the water sprinkler to the water supply, so that the water is now turned-on. During the final movement of piston 21 at the end of its return stroke, its fingers 59 engage the conical mouth 53 of housing 52, thereby pivoting the fingers to their inner position behind, and in alignment with, annular face 55 of projection 54, so that these fingers are in position to engage the projection, and to actuate toggle 45 to close valve member 12, during the beginning portion of the next succeeding forward stroke.

It will thus be seen that piston 21 is displaceable directly by the energy in the pressurized water supply line through cycles of operation each including a forward stroke and a return stroke; and that for a minor portion of each cycle, namely the end portion of the return stroke and the beginning portion of the succeeding forward stroke, the sprinkler 2 is connected to the water supply line via valve member 12 to distribute the water. For the remaining major portion of each cycle, the sprinkler is disconnected from the water supply line thereby turning off the sprinkler. The rate of displacement of piston 21 determines the complete period of each cycle of operation. This rate of displacement is controlled by the slow-discharge nozzle 20 which discharges, at a controlled rate, water from chamber 17 to the atmosphere; chamber 17 receives the water from port 19 during the forward stroke and from port 18 during the return stroke. The period of the complete cycle may thus be preset by nozzle 20 as desired, preferably from about 1 minute to about ½ hour or more. The minor portion of each cycle, during which the water sprinkler is turned on by toggle 45 controlled by stem 57 of piston 21 engaging the actuator rod 50 of the toggle, may vary from about one-fifth to one-fiftieth of the complete cycle.

As one example, the complete period may be ten minutes, with the sprinkler 2 turned on for one-tenth of the period, i.e., for one minute, and turned-off for the remaining nine minutes. During a 24-hour interval, therefore, the sprinkler will be turned-on for 2.4 hours in this example.

In the arrangement illustrated in FIG. 1, discharge chamber 17 could be omitted, and a slow-discharge nozzle 20 could be applied to each of the two ports 18 and 19. In addition, piston 21 could be of another form of displaceable member, such as a bellows-tupe diaphragm. Further, the cyclically-operably timing mechanism including the piston 21, instead of controlling a single water distributor device such as sprinkler 2, could control a distributor line having a plurality of water sprinklers, sprayers, drip emitters or other water distributor devices connected to it.

Figure 3:
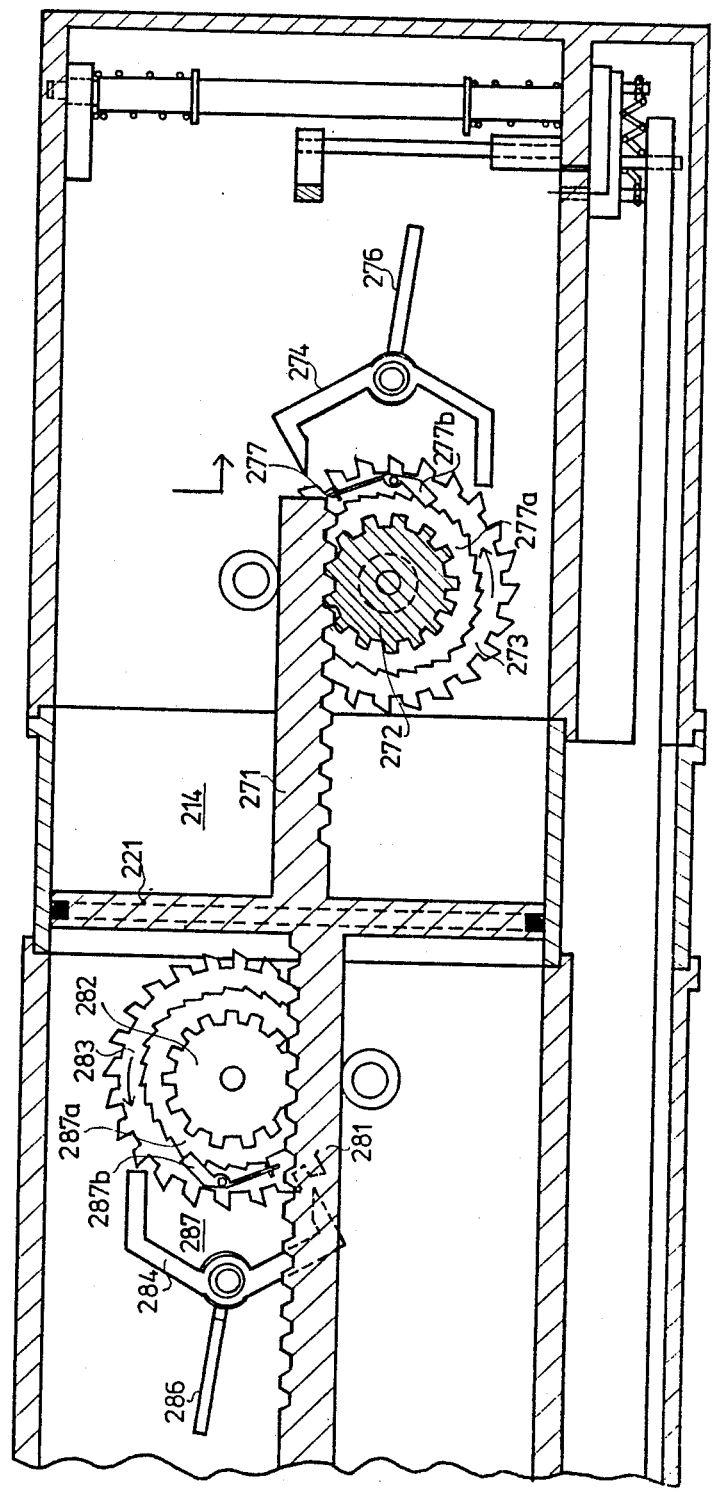
FIG. 3 is a longitudinal sectional view of a third from of water distribution device constructed in accordance with the present invention.
Figure 4:
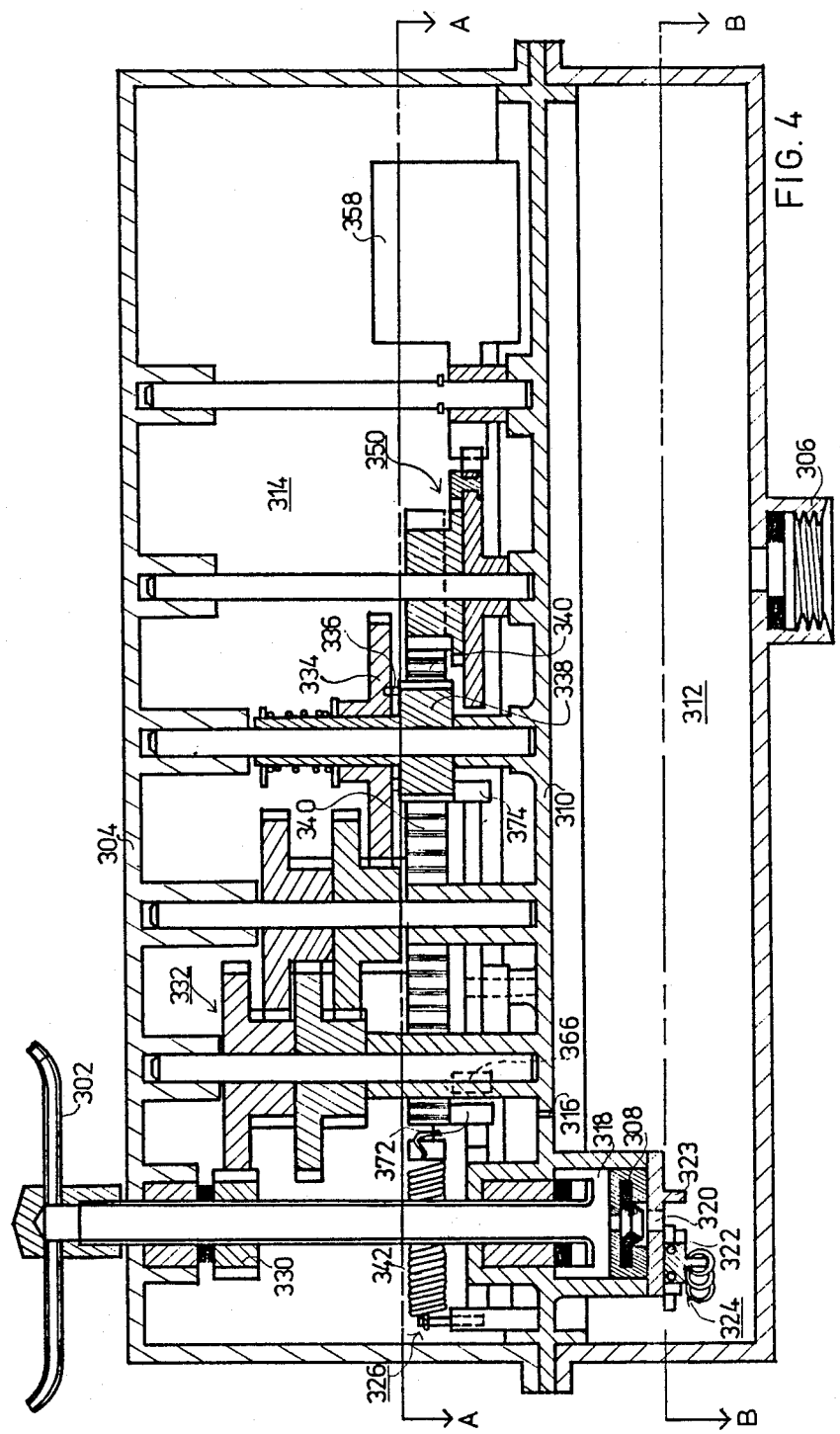
FIG. 4 is a longitudinal section view illustrating a fourth form of water distribution device constructed in accordance with the present invention.

FIGS. 2-4 illustrate still further variations and modifications, primarily directed to the manner of controlling the rate of displacement of the displaceable member, i.e., piston 21 in the FIG. 1 embodiment.

FIG. 2 illustrates a device similar to that of FIG. 1, but including a spring-return controlled by a retarding mechanism for driving the piston through the return stroke. For simplification purposes, FIG. 2 shows only the structure on the right side of the piston, therein designated 121, to its inner stem 157 actuating the main valve to the water distributor, the structure to the left of the piston being the same as shown in FIG. 1.

Thus, as shown in FIG. 2, piston 121 is displaceable through the forward stroke in chamber 114 by the fluid pressure applied to the left side of the piston, in the same manner as described above with respect to FIG. 1. During this movement of piston 121 through its foward stroke, it compresses a coil spring 170 within chamber 114, so that at the end of the forward stroke, the energy stored within spring 170 may be used for driving the piston through its return stroke.

In order to retard the movement of piston 121 during its return stroke, it is provided with a rack 172 engageable with an escapement mechanism including a sprocket wheel 172 meshing with rack 171, an escape wheel 173 fixed to rotate with sprocket wheel 172, and a double-pawl lever 174 pivotably mounted at 175 to permit escape wheel 173 to rotate at a controlled retarded rate. The rate is controlled by a pendulum 176 carried by the double-pawl lever 174 and effective to oscillate the lever at a rate which is retarded by the dampening effect of the water within chamber 114.

Sprocket 172 meshing with rack 171 is coupled to escape wheel 173 via a one-way clutch, schematically shown at 177 in FIGS. 2a and 2b, of any conventional construction such that the clutch decouples escape wheel 173 from sprocket 172, and therefore from piston 121, during the movement of the piston through its forward stroke, but couples the escape wheel to the piston during the return stroke under the influence of spring 170. In all other respects the structure and operation of the sprinkler device illustrated in FIG. 2 is substantially the same as described above with respect to FIG. 1.

FIG. 3 illustrates a still further variation, wherein an escapement mechanism is provided to retard the displacement of the piston, therein designated 221, both during its forward stroke and during its return stroke, both strokes being effected directly by the water pressure as in the FIG. 1 embodiment.

Thus, piston 221 movable within its chamber 214 is provided with a rack 271 engageable with a sprocket 272 coupled, by a one-way clutch 277 on an escape wheel 273 whose rate of rotation is controlled by a double-pawl lever 274 oscillated by a pendulum 276 retarded by the water in chamber 214, as described above with respect to FIG. 2. Here, the one-way clutch 277 includes a ratchet 277a mounted on sprocket 272, and a pawl 277b carried by escape wheel 273. The arrangement in FIG. 3 includes another escape mechanism for retarding the movement of piston 221 also during its forward stroke. This second escape mechanism is constituted of a further rack 281 on the opposite side of piston 221, which further rack meshes with a further sprocket wheel 282 coupled by a one-way clutch 287 to a further escape wheel 283 whose rate of rotation is controlled by another double-pawl lever 284 oscillated by another pendulum 286 retarded by the water in chamber 214. One-way clutch 287 is of the same type as clutch 277, including a ratchet 287a mounted on sprocket 282, and a pawl 287b carried by escape wheel 283.

One-way clutch 287 between sprocket wheel 282 and its escape wheel 283 is effctive to couple the latter to the piston 221 during the forward stroke of the piston; and one-way clutch 277 between sprocket wheel 272 and its escape wheel 273 is effective to couple the latter to the piston 221 during the return stroke of the piston. Thus, in the FIG. 3 arrangement, both the forward stroke and the return stroke of the piston are directly effected by the pressurized water of the water supply line in the same manner as desribed above with respect to FIG. 1, except that in FIG. 3, the rate of displacement of the piston, and therefore the period of the cycle of operation of the device, are controlled by the two escapement mechanisms.

FIGS. 4, 4a and 4b illustrate a still further embodiment of the invention in which, like the embodiments of FIGS. 1-3, there is provided a cyclically-operable-timer comprising a displaceable member reciprocated through forward and return strokes, and a coupling between the latter member and the control valve, effective to actuate the valve to its open position for a minor portion of its cycle, and to its closed position for a major portion of its cycle. However, in the FIG. 4 embodiment, the displaceable member of the cyclically-operable timer is driven by the energy of the pressurized water in a different manner from the FIGS. 1-3 embodiments.

Thus, the water distribution device in the FIG. 4 embodiment includes a rotary sprinkler 302. Sprinkler 302 also may be of the reaction type or hammer-type which imparts a rotary movement to the sprinkler nozzles. The device further includes a housing 304 having an inlet connector 306 for connecting same to a pressurized water supply line (not shown). Whereas in the FIGS. 1-3 embodiments a flow-rate regulator is included in the connector inlet to the device, in the FIG. 4 embodiment it is preferred to include a flow regulator 308 just before the inlet to the sprinkler 302 itself.

The interior of housing 304 is divided by a wall 310 into two main chambers 312, 314, with communication between the two chambers by a vent opening 316 in the wall. Thus, during the normal operation of the device, both chambers 312 and 314 will be filled with water.

The rotary sprinkler 302 is rotatably mounted within a further small chamber 318 containing the previously-mentioned flow regulator 308 in alignment with a valve opening 320 leading from chamber 312 to the sprinkler. Valve opening 320 is adapted to be opened or closed by a valve member 322 which is moved by a snap-action toggle mechanism generally designated 324, to its open position with respect to port 320 as illustrated in FIG. 4, or to a closed position against stop 323 closing port 320, and thereby turning-off the flow of water to the sprinkler 302. Toggle mechanism 324, in the lower chamber 312 and best seen in FIG. 4b, is in turn actuated by another mechanism 326 in the upper chamber 314, as best seen in FIG. 4a.

The rotation of sprinkler 302 by the pressurized water supply is transmitted, via pinion 330 and speed-reduction gearing 332, to a pinion 334 coupled, by a one-way dog clutch 336, to a further pinion 338 meshing with a rack 340. Clutch 336 coupled pinions 334 and 338 together only during the forward stroke of rack 340 (i.e., the stroke moving the rack from left-to-right in FIG. 4), and decouples the pinions during the return stroke (right-to-left) movement of the rack. During the forward stroke of the rack, a spring 342 is loaded, the stored force of the spring being used for driving the rack during its return stroke.

An escape mechanism, generally designated 350 and best seen in FIG. 4a, is provided to retard the movement of rack 340 during its return stroke when driven by spring 342. Escape mechanism 350 is similar to that illustrated and described with respect to the FIG. 3 embodiment. It includes a pinion 352 meshing with rack 340, and an escape wheel 354 whose velocity of rotation is controlled by the velocity of oscillation of a double-pawl lever 356, the oscillation of the latter being retarded by pendulum 358 whose movement is dampened by the water within chamber 314. Escape wheel 354 is coupled to pinion 352 by means of a one-way clutch mechanism including a ratchet 377a coupled to a pawl 377b. The arrangement is such that upon the rotation of pinion 352 clockwise in FIG. 4a, during the forward stroke of rack 340, pinion 352 is decoupled from escape wheel 354, but upon the rotation of the pinion 352 counter-clockwise, during the return stroke of rack 340, pawl 377b is effective to engage ratchet 377a so as to couple escape wheel 354 to pinion 352, and thereby to retard the movement of the pinion and the rack 340 during the return stroke.

Rack 340 includes a stop 366 cooperable with a link 370 to actuate, via the upper toggle 326 (FIG. 4a) and the lower toggle 324 (FIG. 4b), valve member 322 to open and close its port 320 at the appropriate times during the reciprocation of rack 340 through its forward and return strokes. Thus, link 370 includes a pair of depending arms 372, 374, in alignment with projection 366 of rack 340 so as to be engaged by that projection at the ends of travel of the rack. When rack 340 reaches the end of its forward stroke, its projection 366 engages the right arm 374 of link 370, to shift the link rightwardly.

The rightward shifting of link 370 at the end of the forward stroke is effective to actuated valve member 322, via toggles 324 and 326, to close the valve member with respect to port 320 and thereby to terminate the flow of water through the sprinkler 302. When this occurs, the return spring 342 is effective to move the rack 340 through the return stroke (leftwardly in FIG. 4a) under the control of the escapement mechanism 350, until projection 366 on the rack engages the left arm 372 of link 370, to actuate main valve member 322, via mechanisms 324 and 326, to re-open port 320 and thereby to restart the flow of water through the sprinkler 302.

The upper toggle mechanism 326 (see FIG. 4a) directly actuated by link 370, includes a link 380 coupled at one end to the end of link 370 by a pin 381, and coupled at its opposite end to another link 385 by a shaft 383.

Shaft 383 couples upper mechanism 326 (FIG. 4a) to the lower toggle 324 (FIG. 4b), the latter directly actuating the valve member 322 for closing and opening the main valve port 320. Thus, as shown particularly in FIG. 4b, connecting shaft 383 is pivotably mounted between valve member 322 and another link 385, the latter link being pivotably mounted at its opposite end to a pin 386. A toggle spring 387 is applied between pin 386 and another pin 388 on valve member 322. The arrangement is such that, in the position illustrated in FIG. 4b, toggle spring 387 urges valve member 322 to its open position with respect to the valve port 320, i.e. against stop 323'; but whenever shaft 383 is rotated clockwise by the upper mechanism 326, the lower toggle 324 is actuated to move valve member 322 against stop 323, i.e. to the closed position with respect to the main valve port 320.

The water distribution device illustrated in FIGS. 4, 4a and 4b operates as follows:

Assuming that the cycle starts with the parts in the illustrated position, it will be seen that valve member 322 is open with respect to the main valve port 320, so that water flows from the water inlet 306 to the sprinkler 302. As mentioned earlier, the sprinkler is of the rotary type, such that the pressurized water supply imparts a rotary movement to it. This rotary movement of the sprinkler is transmitted, via pinion 330, speed-reduction gearing 332, pinion 334 and one-way dog clutch 336, to pinion rotating the latter pinion in the direction tending to drive rack 340 through its forward stroke, i.e., from left-to-right in FIGS. 4 and 4a. During this forward stroke of the rack, pinion 334 is coupled to pinion 338 by the one-way dog clutch 336, but the rack is decoupled from the escape mechanism 350, because of a disengagement of pawl spring 377b carried by escape wheel 354 from ratchet 377a carried by pinion 352, so that the rack forward-stroke movement will not be retarded.

Rack 340 is thus driven rightwardly by the rotation of the sprinkler 302 until projection 366 (FIG. 4a) of the rack engages the right arm 374 of link 370. When this occurs, link 370 is shifted rightwardly, thereby actuating the upper mechanism 326 to turn connecting shaft 383 clockwise. This clockwise rotation of shaft 383 actuates the lower toggle 324 (FIG. 4b) to move the valve member 322, with a snap-action by toggle spring 387, away from stop 323' and against stop 323, whereby it closes the main valve port 320. The flow of water is thus interrupted through port 320 to sprinkler 302, so that the sprinkler ceases to distribute water and also ceases to rotate. This constitutes the end of the forward stroke, during which spring 342 was loaded by rack 340, and therefore the energy stored in spring 342 is now available for driving the rack through its return stroke. During the return stroke, the movement of the rack is right-to-left, the one-way clutch including pawl 377b and ratchet 377a couples escape wheel 354 to pinion 352, so that the velocity of the rack during this return movement is now retarded by the escape mechanism 350, and particularly by the oscillations of pendulum 358 being dampened by the water within chamber 314. Also, during this return stroke, pinion 338 meshing with rack 340 is decoupled from pinion 334 by the one-way dog clutch, so that the sprinkler 302 is not rotated.

The end of the return stroke is marked by projection 366 of rack 340 engaging the left arm 372 of link 370, shifting the link leftwardly, and thereby actuating the upper mechanism 326, and the lower toggle 324, to the valve-open position as illustrated in FIGS. 4, 4a and 4b, whereupon the sprinkler starts a new cycle of operation.

It will be thus be seen that, in the FIG. 4 embodiment, the water is turned-on during the complete forward stroke, and turned-off during the complete return stroke. However, the return stroke is retarded by the escape mechanism 350 which can be prefixed to take a substantially longer period of time than the forward stroke, so that the sprinkler will be turned-on only for a minor portion of the complete cycle of operation of the rack, as in the FIGS. 1–3 embodiments. As indicated earlier, the "on" portion of each 10-minute cycle could be about one minute, so that the sprinkler will operate for 10% of the time.

As also described with respect to the FIG. 1 embodiment, the reciprocating rack 340 can also be used for controlling a water distribution line to which are connected a plurality of sprinklers, sprayers, drip-irrigation emitters, or other water distribution devices.

The following two tables show the probability (in percentage) that "n" distributors (e.g., sprinklers) or more will be working at any one time, from a total of "N" distributors, when the distributors are active for periods of 10% and 5%, respectively, of each cycle:

TABLE 1

| | | | Active 10% of Each Cycle | | | | | |
|---|---|---|---|---|---|---|---|---|
| 8 | 7 | 6 | 5 | 4 | 3 | 2 | 1 | n/N |
| — | — | 0.01 | 0.16 | 1.3 | 7.0 | 26.4 | 65.1 | 10 |
| — | 0.03 | 0.22 | 1.3 | 5.6 | 18.4 | 45.1 | 79.4 | 15 |
| — | 0.24 | 1.1 | 4.3 | 13.3 | 32.3 | 60.8 | 87.8 | 20 |
| 0.78 | 2.6 | 7.3 | 17.6 | 35.3 | 58.9 | 81.6 | 95.8 | 30 |

TABLE 2

| | | | Active 5% of Each Cycle | | | | | |
|---|---|---|---|---|---|---|---|---|
| 8 | 7 | 6 | 5 | 4 | 3 | 2 | 1 | n/N |
| — | — | — | 0.01 | 0.10 | 1.2 | 8.6 | 40.1 | 10 |
| — | — | 0.01 | 0.06 | 0.55 | 3.6 | 17.1 | 53.7 | 15 |
| — | — | 0.03 | 0.26 | 1.6 | 7.6 | 26.4 | 64.2 | 20 |
| — | 0.06 | 0.33 | 1.6 | 6.1 | 18.8 | 44.7 | 78.5 | 30 |
| 0.07 | 0.34 | 1.4 | 4.8 | 13.8 | 32.3 | 60.1 | 87.2 | 40 |

It will be appreciated that many other variations and applications of the invention may be made. Thus, the return stroke could be effected by a spiral spring which is loaded during the forward stroke. Also, the pressurized water could be applied to an impeller or reaction turbine for driving the cyclically-operable displaceable member; moreover, such member may be rotatable, rather than reciprocatable. Further, other forms of gearing or other transmission mechanisms may be used for coupling the displaceable member to the flow-control valve. In addition, the valve actuated can be a main valve or a pilot valve actuating a main valve.

Many other variations, modifications and applications of the invention will be apparent.

What is claimed is:

1. A water distribution device adapted to be connected to a pressurized water supply line, characterized in that it includes: a valve controlling the flow of water from said water supply line to a water distributor; a cyclically-operable-timer; means for driving said timer through cycles of operation by the energy of the pressurized water in said supply line; said cyclically-operable-timer comprising a displaceable member; means for reciprocating said displaceable member in a continuous manner by the energy of the pressurized water in the supply line through a forward stroke and a return stroke during each cycle; a retarding device acting on the displaceable member to slow down its movement during at least one of said strokes; a valve actuator; and a coupling between said displaceable member and said valve actuator effective, during predetermined points in said forward and return strokes of the displaceable member, to cause the valve actuator to actuate the valve to its open position for a minor portion of each cycle, and to actuate the valve to its closed position for a major portion of each cycle.

2. The device according to claim 1, wherein said valve, timer and retarding device are all mounted within a common housing, and said water distribution device is a sprinkler mounted to said common housing.

3. The device according to claim 1, wherein said valve actuator includes a snap-action toggle mechanism.

4. The device according to claim 1, wherein said retarding device includes an escapement mechanism coupled to the displaceable member during at least one of said strokes for controlling its velocity thereof.

5. The device according to claim 1, wherein said displaceable member is movable within a chamber and is driven at least through one of said strokes in each cycle directly by the energy of the pressurized water in said supply line, said chamber including inlet and outlet ports on opposite sides of said displaceable member which ports are controlled by limit means at the ends of travel of said displaceable member so as to effect the reciprocation of the displaceable member through said forward and return strokes.

6. The device according to claim 5, wherein said displaceable member is directly driven through both said forward and return strokes by the energy of the pressurized water in the supply line.

7. The device according to claim 5, wherein said chamber further includes a controlled discharge port for controlling the velocity of displacement of said displaceable member through at least one of said strokes.

8. The device according to claim 5, wherein said displaceable member is directly driven through the forward stroke by the energy of the pressurized water in the supply line, said device including a return spring which is loaded during the forward stroke and which drives the displaceable member through the return stroke.

9. The device according to claim 5, including an escapement mechanism for retarding said displaceable member during at least one of said strokes.

10. The device according to claim 9, wherein there is a first escapement mechanism coupled to the displaceable member during its forward stroke, and a second escapement mechanism coupled to the displaceable member during its return stroke.

11. The device according to claim 9, wherein said escapement mechanisms includes an escape wheel coupled to the displaceable member, a pair of pawls oscillatingly mounted to control the rate of rotation of the escape wheel, and a pendulum carried by said pair of pawls and retarded by the water in said chamber for controlling the speed of oscillation of the pawls, and thereby the speed of rotation of the escape wheel and the velocity of the displaceable member.

12. The device according to claim 1, wherein said coupling between said displaceable member and said valve actuator comprises a first coupling means carried by said displaceable member and engageable with said valve actuator to actuate the valve to its open position at the end of the return stroke, and second coupling means carried by said displaceable member and engageable with said valve actuator such as to actuate the valve to its closed position at an early point in the forward stroke.

13. The device according to claim 12, wherein said first coupling means comprises a stem carried by said displaceable member and engageable with said valve actuator to actuate the valve to its open condition at the end of the return stroke, and wherein said second coupling means comprises a plurality of fingers carried by said displaceable member and movable in alignment with a projection on said valve actuator only at the end of the return stroke so as to engage same and to actuate the valve to its closed position at an early point in the forward stroke.

14. The device according to claim 13, wherein said plurality of fingers are pivotably mounted to said displaceable member and are spring-biased outwardly out of alignment with said projection on the valve actuator, said valve actuator further including a sleeve within which said plurality of fingers are disposed at the end of the forward stroke of said displaceable member, said sleeve having a conical mouth effective to move said fingers to their inner positions in alignment with said projection on the valve actuator, so as to engage the projection and to move the valve actuator to its closed position, early during the subsequent forward stroke.

15. The device according to claim 1, wherein said water distributor is rotated by the energy of the pressurized water in the supply line, and wherein said displaceable member is movable at least through its forward stroke by a mechanical transmission between the water distributor and the displaceable member coupling same to the water distributor during the rotation thereof.

16. The device according to claim 15, wherein said displaceable member comprises a rack, and said transmission comprises a gear train coupling the water distributor to said rack so as to reciprocate same upon the rotation of the water distributor.

17. The device according to claim 16, further including a return spring loaded during said forward stroke of the rack and effective to drive said rack during its return stroke.

18. The device according to claim 17, wherein said retarding device comprises an escapement mechanism coupled to the rack during its return stroke for retarding the displacement thereof.

19. The system according to claim 15, wherein each of said water distribution devices is a single water distribution unit.

20. A device according to claim 1, wherein said water distributor is a sprinkler.

21. A water distribution system including a plurality of water distribution devices according to claim 1, connected to a common water supply line and randomly operated such that each distributes water randomly during a minor portion of the cycle operation of each device.

22. The system according to claim 21, wherein each of said water distribution devices is a water distribution line supplying water to a plurality of water distribution units on said line.

* * * * *